March 12, 1957  B. RONAY  2,784,487
METHOD OF BUILDING WELD LAYERS BY FUSING
A PLURALITY OF WELD RODS
Filed Dec. 5, 1951
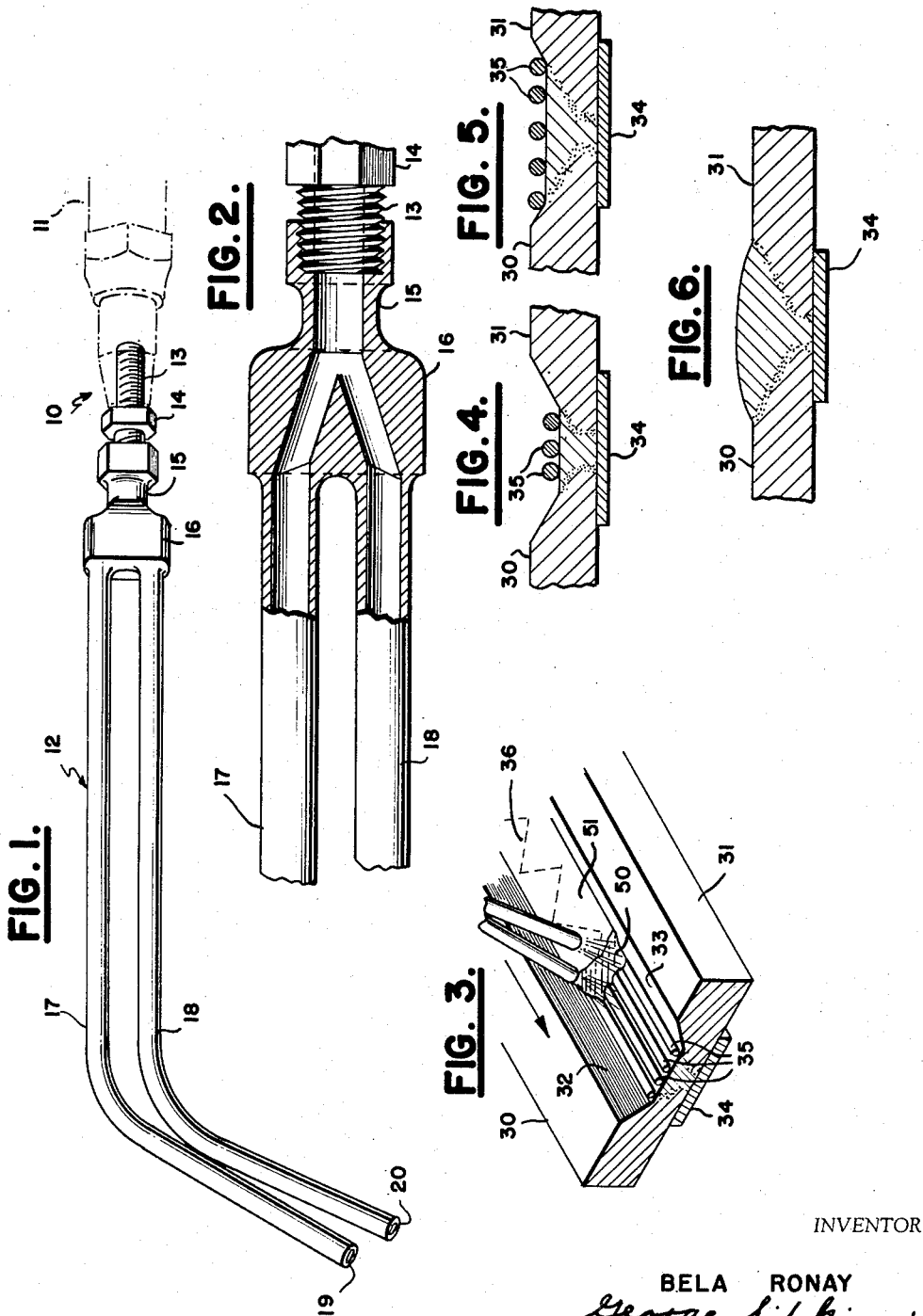
INVENTOR
BELA RONAY
BY George Sipkin
Wilson R. Maltby
ATTORNEYS

United States Patent Office 2,784,487
Patented Mar. 12, 1957

2,784,487

METHOD OF BUILDING WELD LAYERS BY FUSING A PLURALITY OF WELD RODS

Bela Ronay, Glen Burnie, Md.

Application December 5, 1951, Serial No. 260,071

4 Claims. (Cl. 29—497)

(Granted under Title 35, U. S. Code (1952), sec. 266)

The invention herein described may be manufactured and used by or for the Government of the United States of America for governmental purposes without the payment of any royalties thereon or therefor.

This invention relates to nozzle-tip construction for blow torches with particular application to the welding of large mass sections of alloy metals by the oxyacetylene blow torch.

In gas torch welding, as in all welding processes, heat conduction has a close bearing on the efficacy of the method used, and this becomes particularly important where the metal parts to be welded are heavy, exceeding an inch in thickness, and consist of copper alloys such as manganese-bronze. With such castings, where a single tip of an air oxy-acetylene torch, for example, is used, since the heat input at the weld zone is constant, a point is reached in the layer formation where the heat conduction from the weld zone equals or exceeds the normal heat input and a good weld becomes impossible.

The only means to compensate for the insufficiency of heat supply as normally applied to copper-zinc alloys is to prolong the flame dwell by reducing the speed of progression. This procedure necessitates heating the already deposited metal through the freshly deposited metal and results in overheating the latter. Moreover, the flux coverage developed by the retarded movement of the nozzle is either inadequate as in the case of copper-zinc alloy welding rods containing silicon or manganese oxidizers and a borax base flux applied with a neutral flame or it is excessive and uncontrollable as in the case of copper-zinc alloy welding rods applied with an excessive oxygen flame adjustment.

The general object of the invention is to provide an apparatus and method for welding together heavy copper alloy sections which will overcome the difficulties herein above mentioned. More specifically, the objects of the invention are, as applied to heavy metal sections, to provide a balanced heat relationship as against input and output at the weld zone; to provide adequate heat supply and at the same time secure appropriate flux control irrespective of the thickness of the weld; to provide a method of supply of weld material which is operative independently of the thickness of protective slag on the weld surface; to provide a welding method through which overheating at the weld zone is readily prevented; and to provide a weld method permitting full view of both sides of the weld areas so that close timing, proper placement of the torch tips and more uniform welding action may be obtained.

Other objects and features of the invention will appear as consideration of the following detailed description of a preferred embodiment of the invention together with the illustrative accompanying drawings in which Figure 1 is a side view of the torch nozzle as attached to the torch mixing chamber;

Figure 2 is a view partly in section of the nozzle tip header and connector to the main torch unit;

Figure 3 is a perspective detail showing the manner of applying the torch to sections for welding, and the weld rods in place for fusion; and Figures 4, 5 and 6 are sectional views through a weld at different stages of weld completion, Figure 6 showing the completed weld.

The invention, broadly stated, is the employment of weld rods at the weld joint and the use, in addition to a welding flame, of a pre-heat flame whereby the weld area is heat-conditioned for satisfactory fusion temperature. By applying the weld rods in thin fused layers to the weld area, under effective protective covering, a strong and solid weld is secured between the workpiece sections.

In Figure 1 is illustrated a torch section 10 comprising a mixing chamber 11, and a nozzle 12. These parts are jointed by a screw nipple 13, provided with a lock nut 14, the nipple entering the nozzle at the junction 15 of the tip header 16. The nozzle 12 includes the header 16 and two elongated nozzle tips 17 and 18 which extend from the outer edge of the flattened header to a distance adequate for easy application to a weld area.

The nozzle tips are tubular and may be flexible for adjustment for special workpiece uses. Whether flexible or rigid the tips are positioned so that the tip ends 19 and 20 are adjacent each other but the upper or outer end 19 displaced rearwardly from the end 20 of the lower tip. In other words, the tip ends lie in stepped planes, with the outer or advanced end lying in a plane retracted from that including the rear or lower end. The amount of this retraction may be as much as ¾ to 1 inch and depends on such variables as gas pressure and weld materials. The advance tip is termed the pre-heat tip and the rear tip the weld-tip; and as this terminology suggests, the advance nozzle pre-heats the workpiece, but due to its greater displacement does not cause fusion of the weld material, whereas the rear tip which is positioned directly at the weld area is at fusion distance.

Appropriate fluxing materials are introduced to the weld area, such as borax base flux, preferably by injection in the acetylene or by powder dispensers attached to one or both tips.

The welding procedure follows. The workpiece which is assumed to be a manganese-bronze or a high zinc-copper alloy casting in the form of spaced blocks 30 and 31 having abutting square edges to be joined together, is first bevelled at the edges as at 32 and 33 and placed edge to edge over a backing strip 34 where the edges may be tacked together. Weld rods 35 of copper-zinc alloy are placed side by side at the base of the groove, employing not less than 3/16 inch diameter rods for each inch of groove-width. If other than 3/16 inch diameter rods are used, the number per inch width shall be such that the resultant layer thickness does not exceed ⅛ inch.

The fusing step is performed by passing the torch tips from one end of the weld groove to the other so that the pre-heat tip 17 leads the weld tip 18, and the weld tip end is about 1 inch to 1½ inch above the rods. The capacity of the torch should preferably be at least 300 cubic feet of acetylene per hour. Where the weld strip is wide the torch may be moved along an advancing zig-zag line as suggested by broken line 36 in Figure 3.

Desirably the welder should stand at the end of the V so he may readily view both walls thereof as the torch is moved outwardly away from the welder. In so moving the pre-heat tip 17 supplies an initial heat supply to the weld rods and the supporting weld bed which brings the metal temperature to some point just below that of fusion. The following weld tip 18, because of the close proximity of the same to the workpiece, brings about fusion of the weld rods and the underlying top weld layer as indicated at 50, Fig. 3, the fused metal forming on solidification a thin layer 51 on the underlying layer. On this new layer a new layer of weld rods is placed and the torch again passed over the rods to form another weld layer, and in this fashion the weld is built up until a capping layer is completed. Successive weld steps are illustrated in Figures 4, 5 and 6 including the top layer weld in Figure 6. The backing plate 34 is then removed and the projecting weld root chipped out and rewelded.

During the welding operation as above described the borax base flux material which, as previously stated, may be incorporated in the acetylene line, continuously forms as a protective zinc oxide slag or dross on the surface of each layer so that atmospheric contamination is avoided. This condition is aided also, by the large neutral zone produced by the two closely positioned neutral and low velocity torch flames. Furthermore the successive remelting of each top layer as the weld is being built causes effective de-gassing to take place, the action simulating that of a hot shrink head or riser. This effective control of oxidation is made possible by the use of weld rods placed on the successive weld layers as distinguished from the use of a single manually supported weld rod, and by use of such a heat supply furnished by the twin-tip torch as will be adequate to penetrate the progressively increasing slag layer and obtain proper melting of the base layer.

It is observed that since the welder stands at the end of the weld V he is in a position to see both sides thereof without being required to bend over the weld area. This is a technological consideration of importance since bodily discomfort and danger from weld heat and fumes are avoided and, moreover, by seeing the melting action on both sides of the weld, proper movement of the torch may be made to obtain uniform welding. From these advantages the welding process is speeded up substantially in excess of 150 cubic feet of acetylene per hour, heretofore considered maximum in prior methods.

It is pointed out further that the use of small weld rods, 3/16 inch in diameter in the disclosure, insures a large surface to volume ratio and adequate heat transfer accordingly. Small rods also insure limitation of remelt on each welding pass to the approximate depth only of the last previously formed layer and since this remelted layer has the protection of the new fused layer above it, conditions are right for de-gassing of the remelted stratum and for supply of new metal thereto arising from shrinkage.

While the above described method has particular application to manganese bronze sections of substantial thickness exceeding one inch obviously the method may be applied to any weldable material where the mass is such as to develop large heat conduction from the weld area. A two flame torch has been found useful but under certain conditions either the prior-heat or weld tip may be multiplied in number. Other modifications, such as related to gas pressure, tip spread and the like may be made by those skilled in the art, without departing from the spirit and scope of the invention as hereinafter defined by the appended claims.

What is claimed is:

1. The method of fusing weld areas in a junction space between adjacent edges of aligned heavy metal sections which comprises placing a layer of a plurality of elongated fusion metal rods in said space so that the rods are substantially parallel to each other and to the adjacent edges of the metal sections and in contact with such sections, applying a sub-melt pre-heat to said rods and to said metal sections in a single pass from end to end thereof, simultaneously applying a melt-heat at a point behind said pre-heat, whereby the rods and space walls of said metal sections are first brought to a sub-melt heat and then fused in close succession, permitting the layer formed by the melt to solidify, and repeating the rod placing, pre-heating and melt steps successively until the space is filled with an accretion of inter-fused layers between said sections.

2. A method of building weld layers in a weld space between adjacent edges of aligned workpiece sections which comprises placing a layer of a plurality of elongated fuse-rods in said space so that the rods are substantially parallel to each other and to the adjacent edges of the sections and in contact with such sections, moving a sub-melt pre-heat flame along said rods and space from one end to the other while simultaneously applying a melt-heat flame to said rods and workpiece sections in spaced relation to and behind said pre-heat flame whereby the rods are fused, to form a thin weld layer in said weld space, laying an additional layer of rods on said new weld layer, moving the sub-melt pre-heat flame along said rods from the other end to the one end while simultaneously applying the melt-heat flame behind the pre-heat flame, to form a second weld layer and repeating the rod-pre-heat-weld cycle until the weld space is filled with fused filler metal.

3. A method of building weld layers in a weld space between adjacent edges of workpiece sections which comprises placing a layer of a plurality of elongated weld rods in said space in contact with said workpiece sections so that the rods are substantially parallel to each other and to the adjacent edges of such sections, providing a sub-melt preheat flame and a melt-heat flame in spaced relations to each other and to the workpiece sections with the sub-melt flame in advance of the melt flame, and causing simultaneous relative movement between the two flames and the workpiece sections with the weld rods in contact with such sections, whereby the workpiece sections and weld rods are first preheated and then melt-heated to thereby form a thin layer of weld in the weld space between the workpiece sections, and repeating the rod placing, preheating and melt-heating operations until the space is filled with fused filler metal.

4. A method of building weld layers in a weld space between adjacent edges of workpiece sections which comprises placing a layer of plurality of elongated weld rods in said space in contact with said workpiece sections so that the rods are substantially parallel to each other and to the adjacent edges of such sections, simultaneously passing along the length of the weld rods a sub-melt pre-heat flame and a melt-heat flame in spaced relation to each other and to the workpiece sections with the sub-melt flame in advance of the melt flame whereby the workpiece sections and weld rods in contact therewith are first preheated and then melt-heated to thereby form a first thin layer of weld in the weld space between the workpiece sections, placing an additional layer of weld rods on said first layer of weld, passing the sub-melt pre-heat flame and the melt-heat flame along the workpiece sections, the weld layer and the additional weld rods in contact therewith to thereby remelt and degas the first weld layer and simultaneously form a second thin layer of weld thereon between the workpiece sections, and repeating the rod placing, preheating, melt-heating, de-gassing cycle until the weld space is filled with fused filler metal.

(References on following page)

References Cited in the file of this patent

UNITED STATES PATENTS

| | | |
|---|---|---|
| 1,915,946 | Ost | June 27, 1933 |
| 1,947,755 | Bucknam et al. | Feb. 20, 1934 |
| 1,959,791 | Kautz | May 22, 1934 |
| 2,122,994 | Southgate | July 5, 1938 |
| 2,141,021 | Rooke et al. | Dec. 20, 1938 |
| 2,182,796 | Deming | Dec. 12, 1939 |
| 2,206,375 | Swift | July 2, 1940 |
| 2,250,561 | Wissler | July 25, 1941 |
| 2,260,342 | Scott | Oct. 28, 1941 |
| 2,319,487 | Baldwin | May 18, 1943 |
| 2,402,165 | Kinkead | June 18, 1946 |

OTHER REFERENCES

Welding Encyclopedia, tenth edition, page 200, published by The Welding Engineer Publishing Co., 506 South Wabash Avenue, Chicago, Illinois.